(12) United States Patent
Yang et al.

(10) Patent No.: US 11,506,268 B1
(45) Date of Patent: Nov. 22, 2022

(54) EXTERNAL CIRCULATION BALL SCREW

(71) Applicant: HIWIN TECHNOLOGIES CORP., Taichung (TW)

(72) Inventors: Ivan Yang, Taichung (TW); Ting-Yuan Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 0 days.

(21) Appl. No.: 17/449,358

(22) Filed: Sep. 29, 2021

(51) Int. Cl.
*F16H 25/20* (2006.01)
*F16H 25/22* (2006.01)

(52) U.S. Cl.
CPC ................................ *F16H 25/2214* (2013.01)

(58) Field of Classification Search
CPC ... F16H 25/2214; F16H 25/22; F16H 25/2223
See application file for complete search history.

(56) References Cited

U.S. PATENT DOCUMENTS

| | | | | |
|---|---|---|---|---|
| 6,955,468 B2* | 10/2005 | Yabe | | F16C 29/0638 384/520 |
| 2003/0172759 A1* | 9/2003 | Hayashi | | F16H 25/2214 74/424.86 |
| 2004/0123691 A1* | 7/2004 | Hayashi | | F16H 25/2214 74/424.86 |
| 2012/0073397 A1* | 3/2012 | Kuo | | F16H 25/2214 74/424.82 |
| 2012/0192668 A1* | 8/2012 | Hsu | | F16H 25/2214 74/424.89 |
| 2014/0083224 A1* | 3/2014 | Lin | | F16H 25/2214 74/424.83 |

* cited by examiner

*Primary Examiner* — Zakaria Elahmadi
(74) *Attorney, Agent, or Firm* — Wang Law Firm, Inc.

(57) ABSTRACT

An external circulation ball screw includes: a screw shaft; a nut sleeved on the screw shaft and including a through hole having an opening end; and a return member mounted on the nut, and including a return groove having a return section and a continuation section, one end of the return section connected to the through hole including a connecting end which abuts against the opening end. The opening end and the connecting end are non-tangentially connected, the return section circles around a reference point, the outer wall surface of the return section is arc-shaped and centered on the reference point, a distance between the outer wall surface and the reference point is a radius of curvature, and the radius of curvature is greater than or equal to 1.2 times the ball diameter, but is less than or equal to 1.5 times the ball diameter.

5 Claims, 11 Drawing Sheets

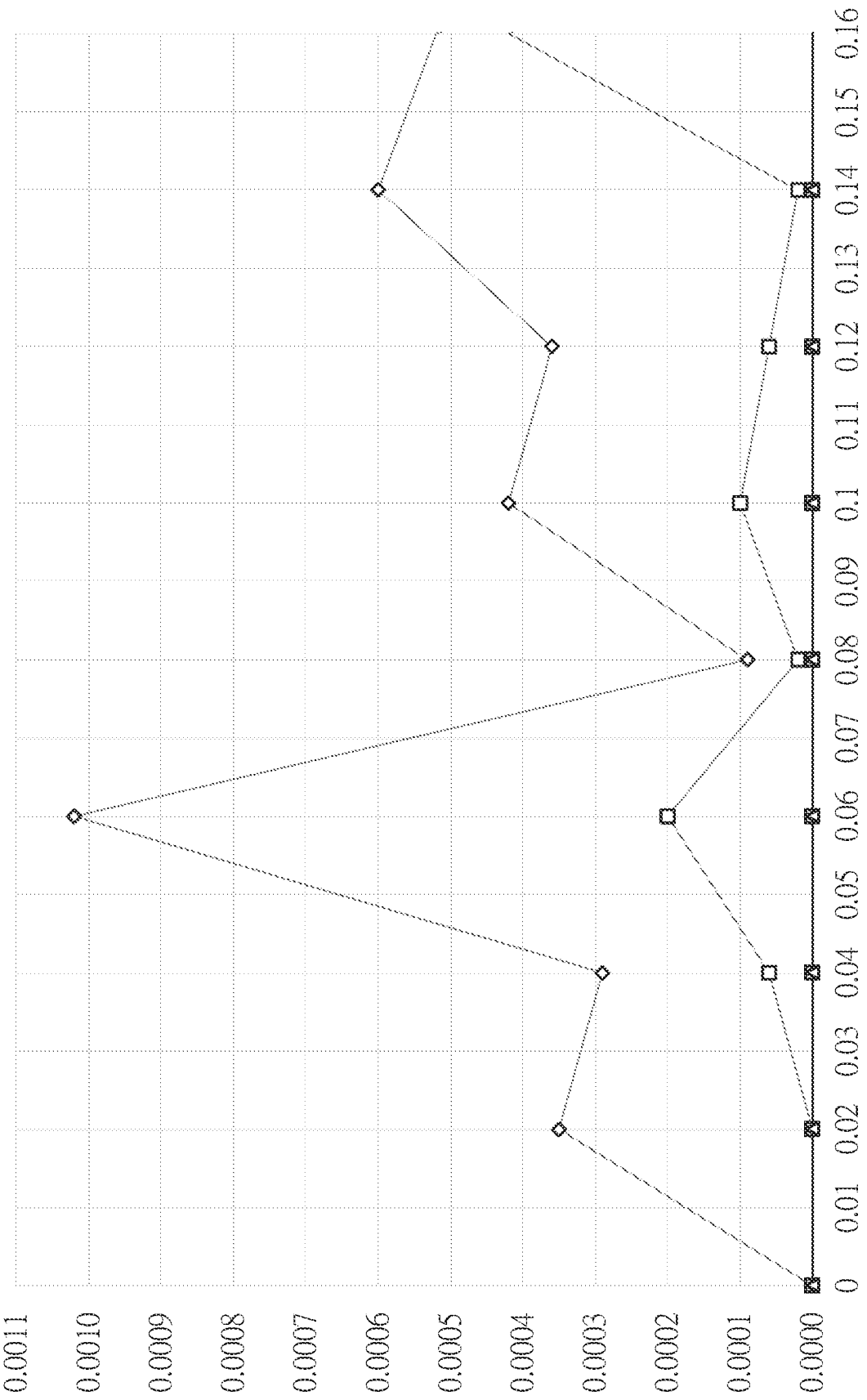

EXTERNAL CIRCULATION BALL SCREW

BACKGROUND

Field of the Invention

The present invention relates to a ball screw, and more particularly to an external circulation ball screw.

Description of Related Art

In order to cope with the current automotive electronics and consumer electronics products, the ball screw includes been developed towards the direction of miniaturization. However, in the existing design of the internal return plate, there is generally a height difference between the nut and the return plate, so that when the diameter of the ball is small, it will produce noticeable unsmoothness.

The existing tangential external circulation ball screw, as shown in FIG. 1, includes a nut 70, a return upper cover 80 combined with the nut 70, and a plurality of balls 90 movable between the nut 70 and the return upper cover 80. The nut 70 is includes two through holes 71, and the extending direction of the through holes 71 as a moving direction Z. The return upper cover 80 includes a return passage 81 which communicates with the through holes 71, so that the balls 90 can circulate. The return passage 81 and the through holes 71 are connected in a tangential manner. The return passage 81 includes a return section 811 and an extending section 812 that are connected, because the return passage 81 and the through holes 71 are connected in a tangential manner, and the inner space of the return section 811 is relatively large. Therefore, when the balls 90 enter the return section 811 through the through holes 71, the ball 90 will inertially hit the corresponding upper edge of the wall surface 811A of the return section 811, so that, after the balls 90 hit the wall surface 811A of the return section 811, the component of the reaction force along the moving direction Z is relatively large, causing the front ball 90 and the rear ball 90 to squeeze, resulting in the disadvantages of ball squeezing and large impact force.

SUMMARY

The present invention provides an external circulation ball screw, the main objective of which is to provide a miniature ball screw that makes the balls flow smoothly and avoid the problem of ball squeezing.

To achieve the above objective, the external circulation ball screw provided by the present invention comprises:
a screw shaft;
a nut sleeved on the screw shaft, a ball passage being formed between the nut and the screw shaft, the nut including at least one through hole in communication with is the ball passage, the at least one through hole including an opening end;
a plurality of balls disposed and circulating in the ball passage, and each of the balls having a ball diameter; and
a return member mounted on the nut, and including a return groove in communication with the at least one through hole, the return groove including a return section in communication with the at least one through hole, one end of the return section connected to the at least one through hole including a connecting end which abuts against the opening end, wherein the opening end and the connecting end are connected in a non-tangential manner, the return section circles around a reference point, the return section corresponds to an outer wall surface, the outer wall surface is arc-shaped and centered on the reference point, a distance between the outer wall surface and the reference point is defined as a radius of curvature, and the radius of curvature is greater than or equal to 1.2 times the ball diameter, but is less than or equal to 1.5 times the ball diameter.

It can be learned from the above that the present invention mainly defines that the radius of curvature R is greater than or equal to 1.2 times the ball diameter but is less than or equal to 1.5 times the ball diameter, and the opening end and the connecting end are connected in a non-tangential manner, which can effectively reduce the problem of ball squeezing caused by the unsmooth flow of the balls.

BRIEF DESCRIPTION OF THE DRAWINGS

FIG. 5G shows the impact force data graph of the invention, under the condition that the through holes and the return groove are connected non-tangentially, and the radius of curvature is 1.0 mm

DETAILED DESCRIPTION

Figure 1:
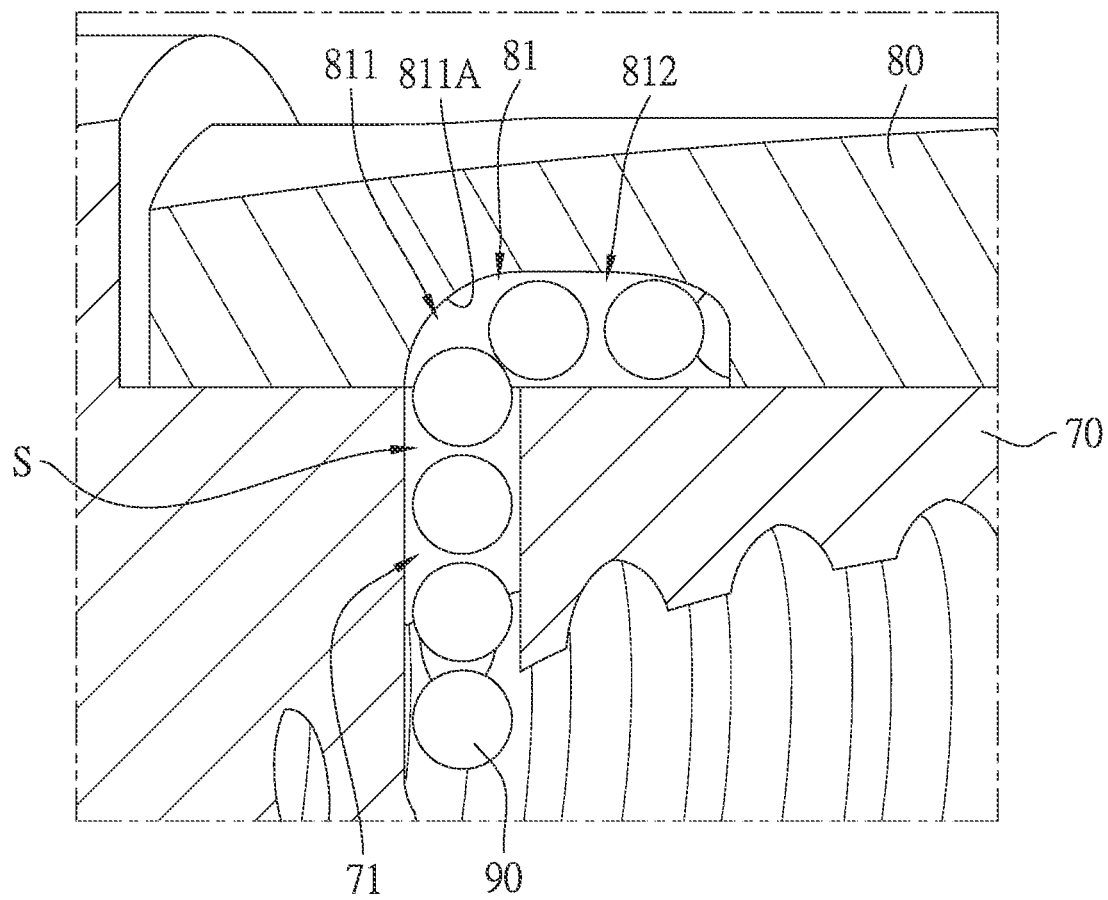
FIG. 1 shows a conventional ball screw in which the return passage and the is through holes are connected in a tangential manner.
Figure 2:
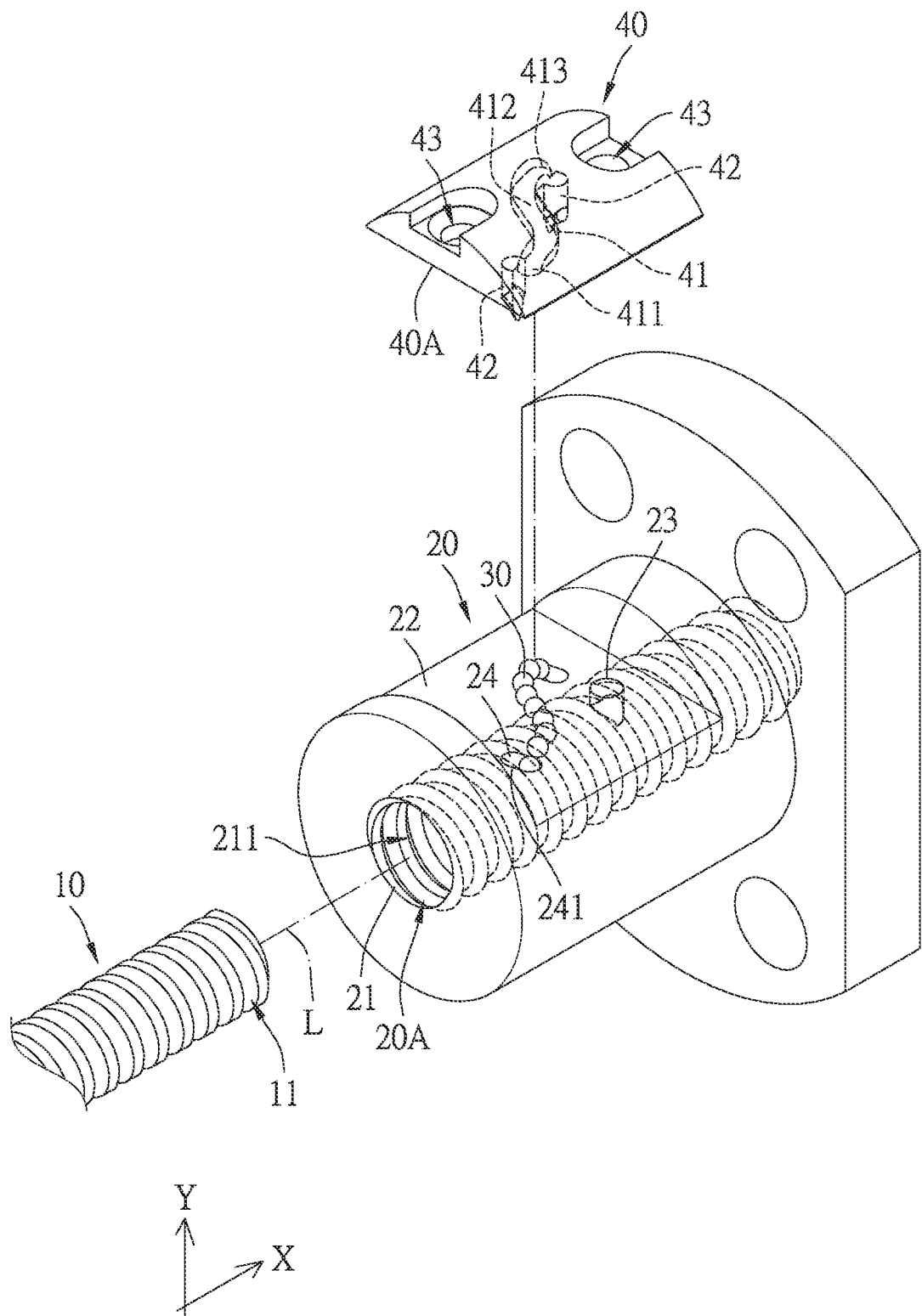
FIG. 2 is an exploded view of an external circulation ball screw in accordance with the present invention.
Figure 3:
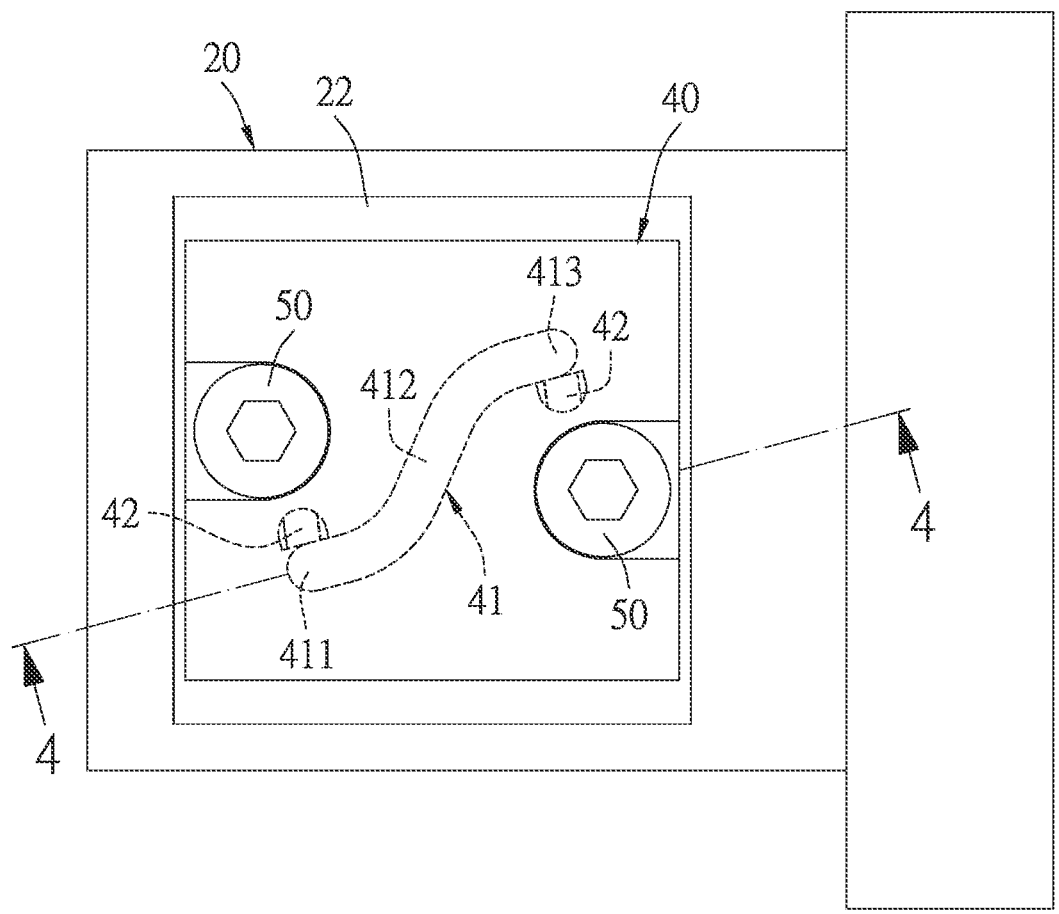
FIG. 3 is a schematic top view of the external circulation ball screw in accordance with the present invention.
Figure 4:
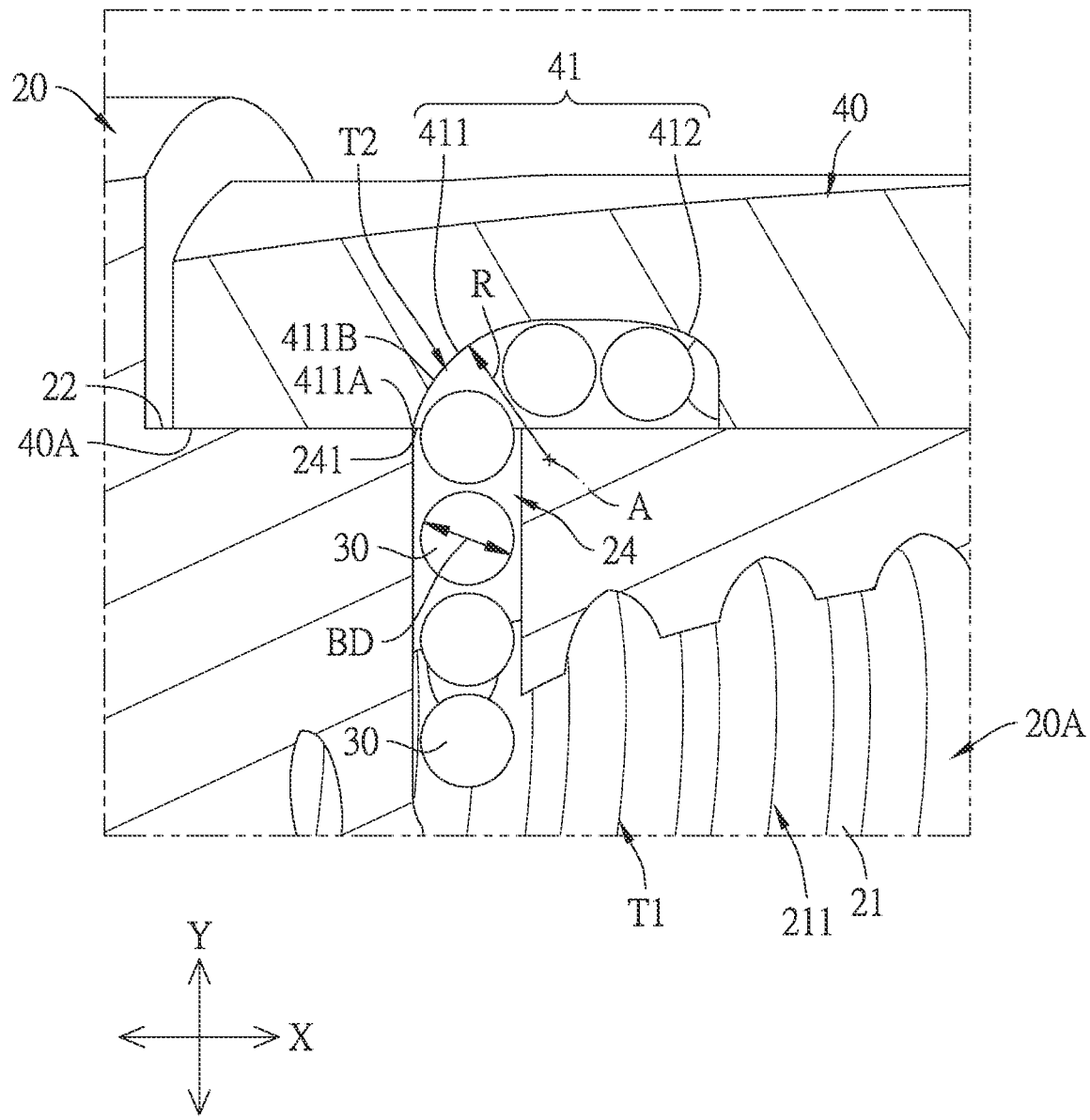
FIG. 4 is a schematic diagram of the invention showing the non-tangential connection between the through holes and the return groove.

The present invention provides an external circulation ball screw. In one of the embodiments, please refer to FIGS. 2-4, the invention comprises: a screw shaft 10, a nut 20, a plurality of balls 30, and a return member 40.

The screw shaft 10 extends along an axis L, an outer circumferential surface of the screw shaft 10 includes an external thread groove 11, and the axis L defines an axial direction X.

The nut 20 is sleeved on the screw shaft 10, and includes: an insertion hole 20a for insertion of the screw shaft 10, an inner surface 21 and an outer surface 22 opposite to each other. The outer surface 22 is a flat surface. The inner surface 21 faces the insertion hole 20a and includes an internal thread groove 211 corresponding to the external thread groove 11. A ball passage T1 is formed between the internal thread groove 211 and the external thread groove 11. The nut 20 includes two first is thread holes 23 and two through holes 24, and the two first thread holes 23 and the two through holes 24 penetrate the outer surface 22. The ball passage T1 communicates with the two through holes 24, the two through holes 24 penetrate the outer surface 22 at an opening end 241, and an extending direction of each of the through holes 24 is a vertical direction Y.

A plurality of balls 30 are disposed and circulate in the ball passage T1, and each of the balls 30 has a ball diameter BD. In a specific embodiment, the ball diameter BD is between 1.0 mm and 0.4 mm A return member 40 is mounted on the outer surface 22 of the nut 20, and includes a bearing surface 40A facing the outer surface 22. The bearing surface 40A is flat, and includes a return groove 41. The return groove 41 and the two through holes 24 jointly form a return path T2, and the return path T2 is in communication with the ball passage T1. The return groove 41 includes a return section 411, a continuation section 412 and a outlet section 413 which are connected in sequence. The return section 411 communicates with one of the through holes 24, and the outlet section 413 communicates with another one of the through holes 24. One end of the return section 411 connected to the through hole 24 includes a connecting end 411A which abuts against the opening end 241, and another end of the return section 411 is connected to the continuation section 412. An extending direction of the return section 411 includes the components of the axial direction X and the vertical direction Y, so that an outer wall surface 411B corresponding to the return section 411 is arc-shaped, the return section 411 circles around a reference point A, and the outer wall surface 411B is is centered on the reference point A. A distance between the outer wall surface 411B and the reference point A is a radius of curvature R, and the radius of curvature R is greater than or equal to 1.2 times the ball diameter BD, but is less than or equal to 1.5 times the ball diameter BD.

The opening end 241 and the connecting end 411A are connected in a non-tangential manner, so that the return path T2 is a non-tangential path.

As a result, since the connecting end 411A of the return section 411 of the return groove 41 and the opening end 241 of the through hole 24 are connected in a non-tangential manner, compared with the conventional tangential connection design, when the radius of curvature R is the same, the inner space of the return section 411 of the present invention is relatively small, and the position where the balls 30 hit the outer wall surface 411B of the return section 411 is closer to the connecting end 411A, so that the component force along the axial direction X of the reaction force of the ball 30 hitting the outer wall surface 411B is relatively large. Therefore, the ball 30 in the front is less likely to be squeezed by the ball 30 in the rear when entering the continuation section 412 along the return section 411, so the impact force is relatively small, which consequently can improve the smoothness of the return flow of the balls.

The return member 40 further includes two second thread holes 43 located corresponding to the two first thread holes 23 respectively, and two locking members 50 are respectively inserted through the first thread holes 23 and the second thread holes 43 to lock the return member 40 on the nut 20.

Preferably, the return member 40 further includes two extending portions 42 which extend from the bearing surface 40A, one of the extending portions 42 is adjacent to the return section 411, another one of the extending portions 42 is adjacent to the outlet section 413, and the extending portions 42 are respectively inserted into the through holes 24.

Figure 5A:
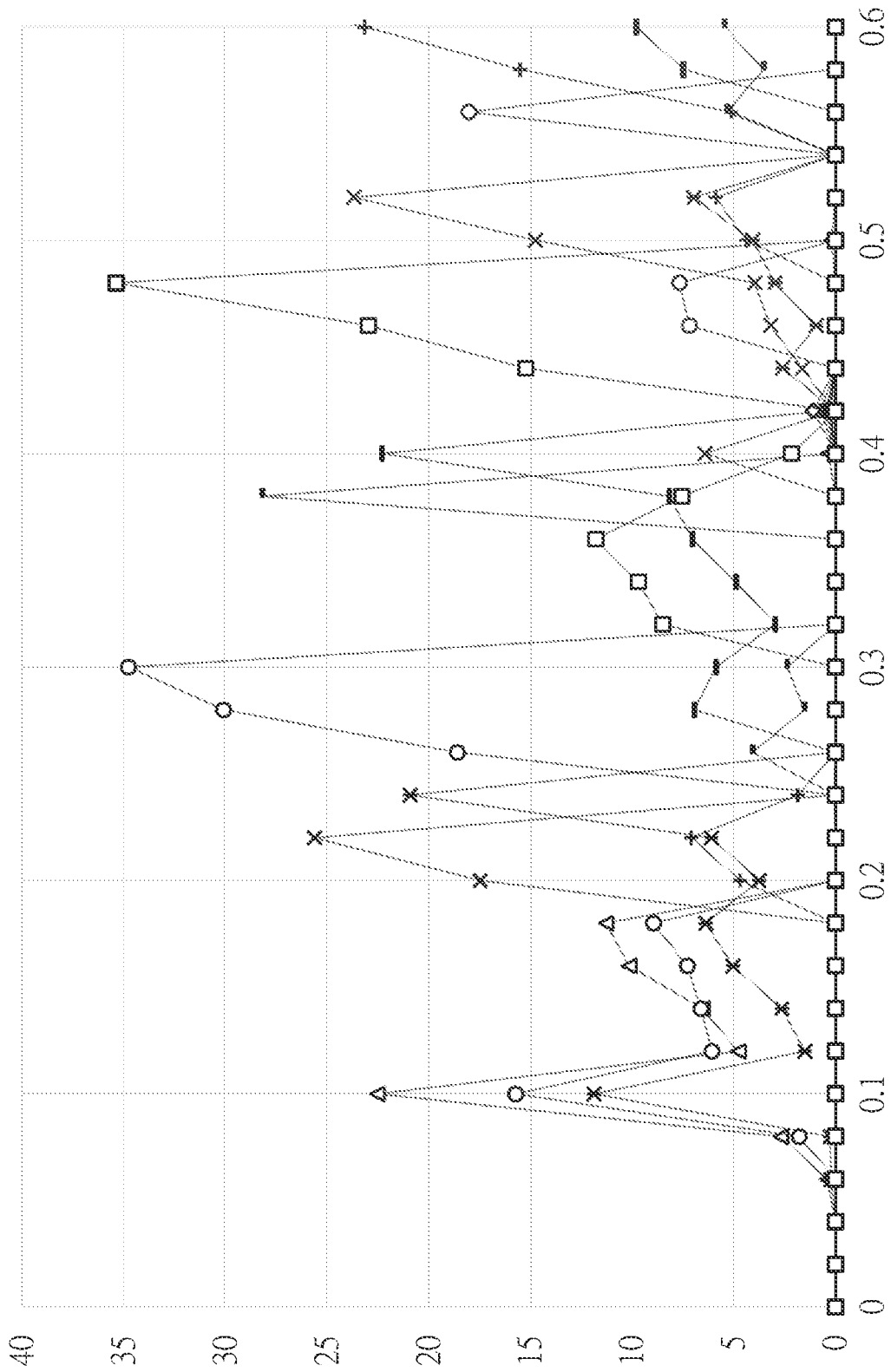
FIG. 5A shows the impact force data graph, under the condition that the conventional return passage and the through holes are connected in a tangential manner, the radius of curvature is 0.7 mm, where Each fold line in the coordinates represents the impact force generated by each ball at different time points, the horizontal axis in the figures represents time, the unit is second (S), and the vertical axis represents the impact force, and the unit of impact force is Newton (N)
Figure 5B:
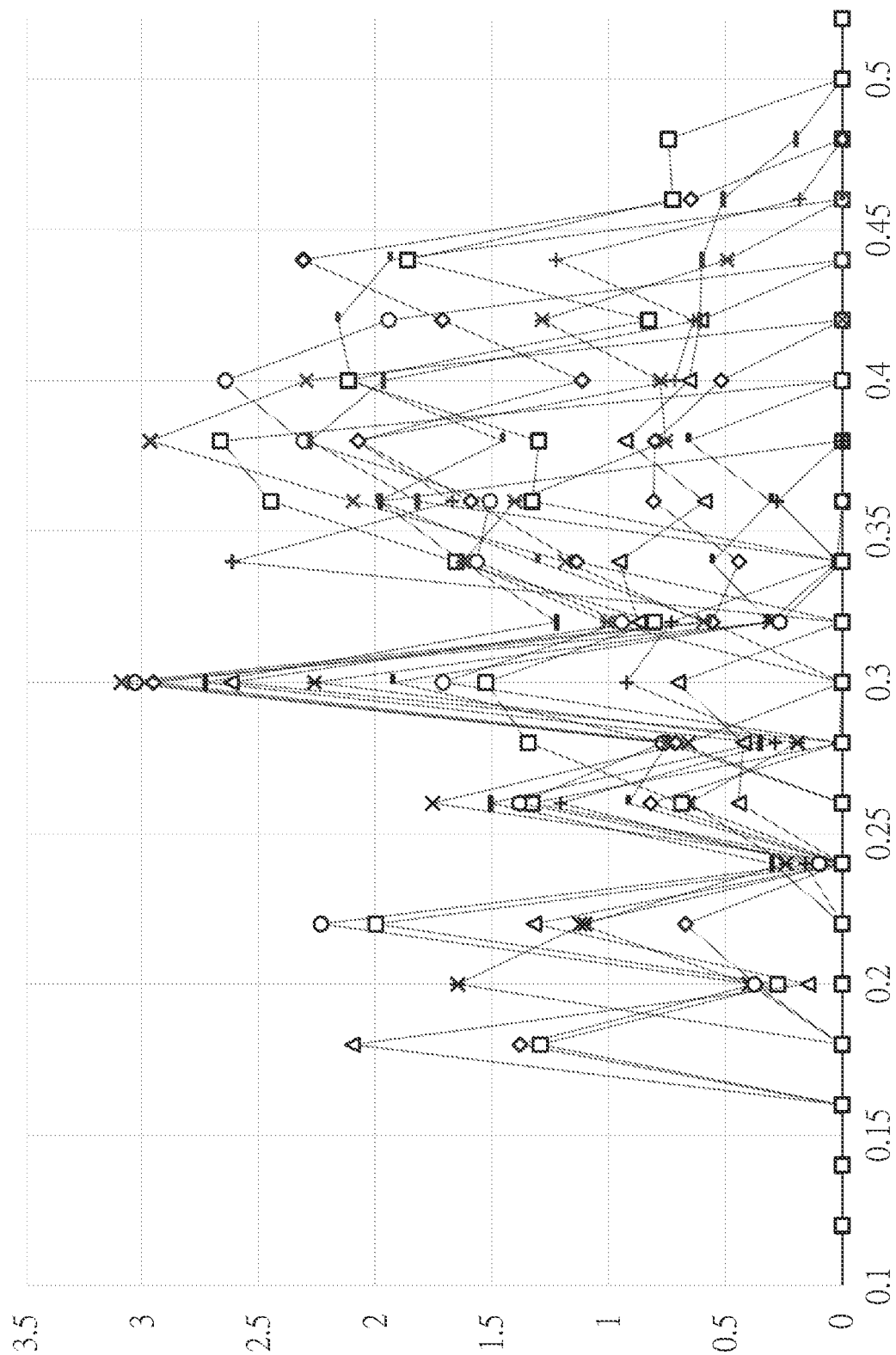
FIG. 5B shows the impact force data graph, under the condition that the conventional return passage and the through holes are connected in a tangential manner, and the radius of curvature is 0.8 mm.
Figure 5C:
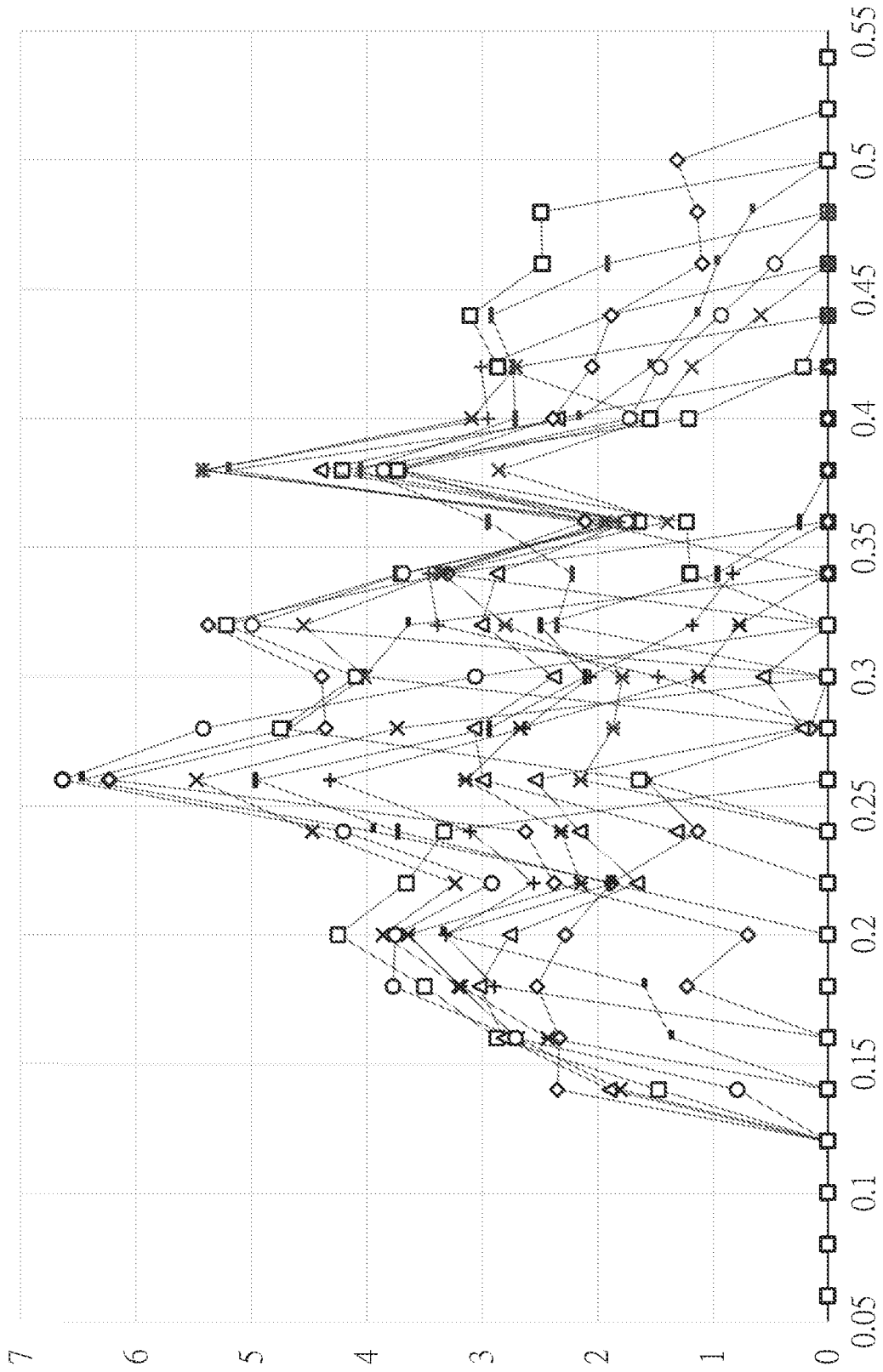
FIG. 5C shows the impact force data graph, under the condition that the conventional return passage and the through holes are connected in a tangential manner, and the radius of curvature is 0.9 mm.

The above is the configuration description of the main components of each embodiment of the present invention. As for the effects of the present invention, the description is as follows:

The computer simulates the impact force on the return passage 81 when the balls 90 pass through the conventional return upper cover 80. Please refer to FIGS. 5A to 5C, which show the impact force caused by the balls 90 when passing through the return passage 81, under the condition that the conventional return passage 81 and the through hole 71 are connected in a tangential manner, and the ball diameter is 0.6 mm Each fold line in the coordinates represents the impact force generated by each ball 90 at different time points in the return passage 81, the horizontal axis in the figures represents time, the unit is second (S), and the vertical axis represents the impact force, the unit of impact force is Newton (N). When the radius of curvature is 0.7 mm, please refer to FIG. 5A, the average impact force of the balls 90 is 13N, and the maximum impact force of the balls 90 is 35.37N. When the radius of curvature is 0.8 mm, please refer to FIG. 5B, the average impact force of the balls 90 is 1.5N, and the maximum impact force of the balls 90 is 3.09N. When the radius of curvature is 0.9 mm, please refer to FIG. 5C, the average impact force of the balls 90 is 3.7N, and is the maximum impact force of the balls 90 is 6.47N.

Figure 5D:
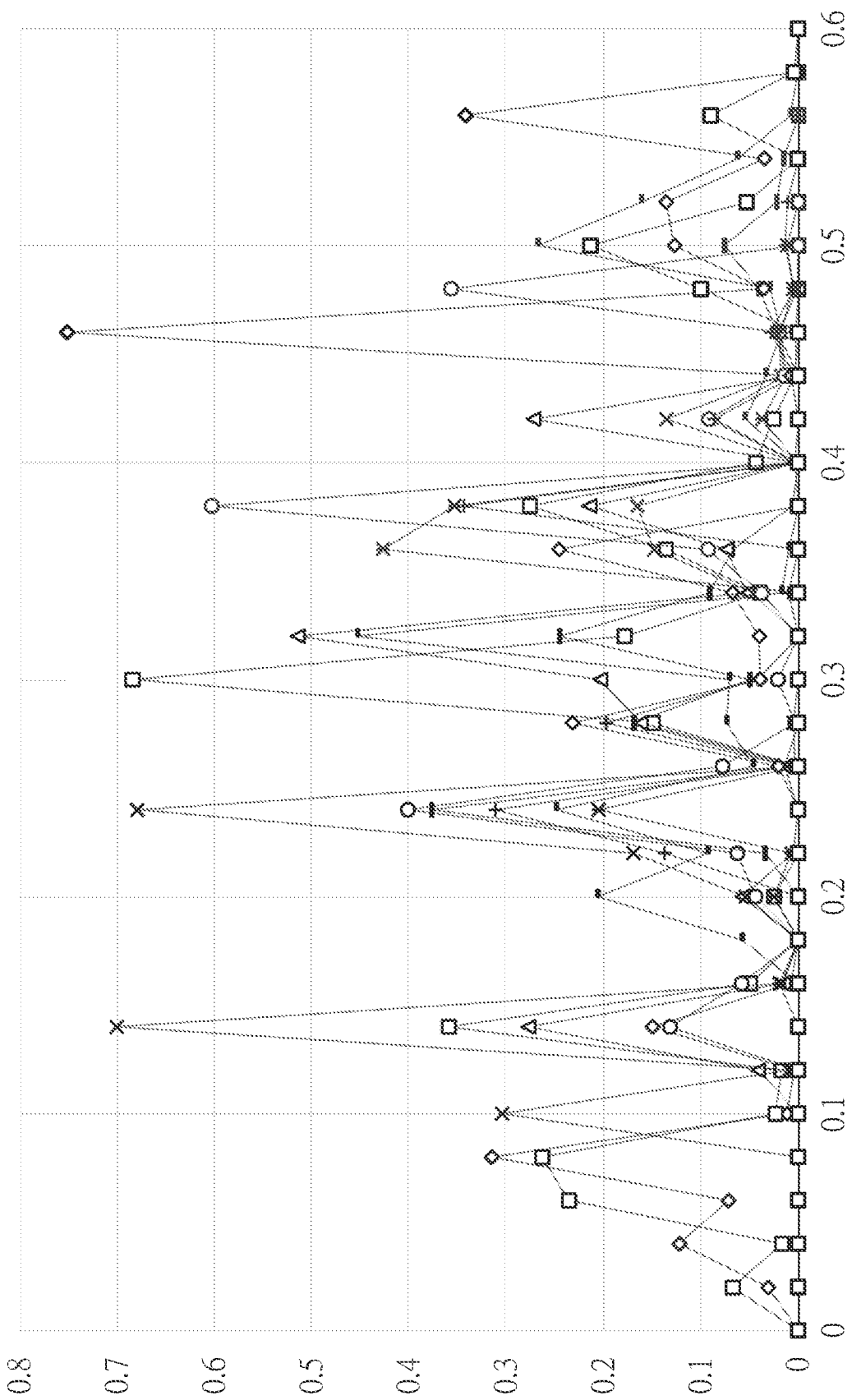
FIG. 5D shows the impact force data graph of the invention, under the condition that the through holes and the return groove are connected non-tangentially, and the radius of curvature is 0.8 mm.
Figure 5E:
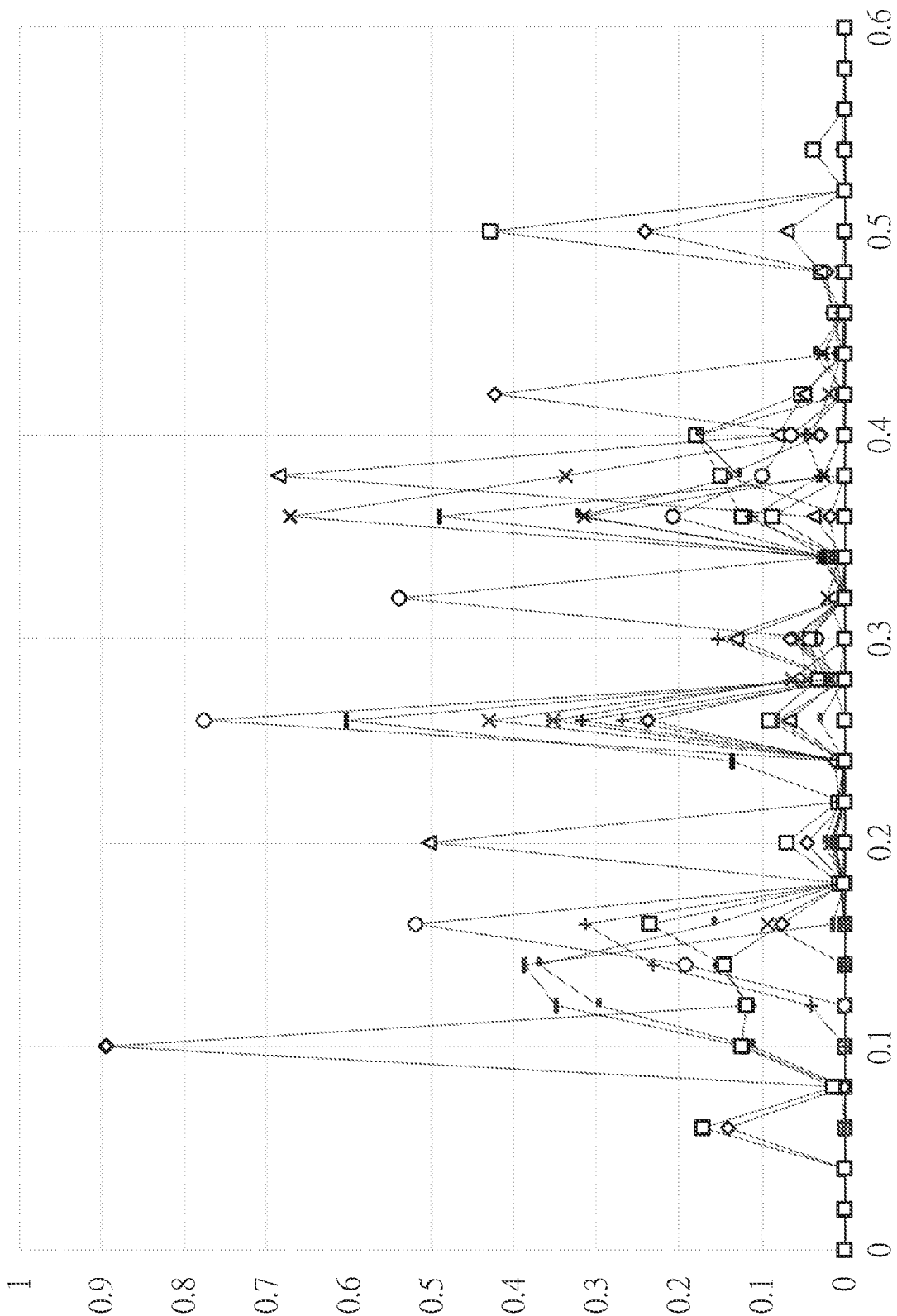
FIG. 5E shows the impact force data graph of the invention, under the condition that the through holes and the return groove are connected non-tangentially, and the radius of curvature is 0.85 mm.
Figure 5F:
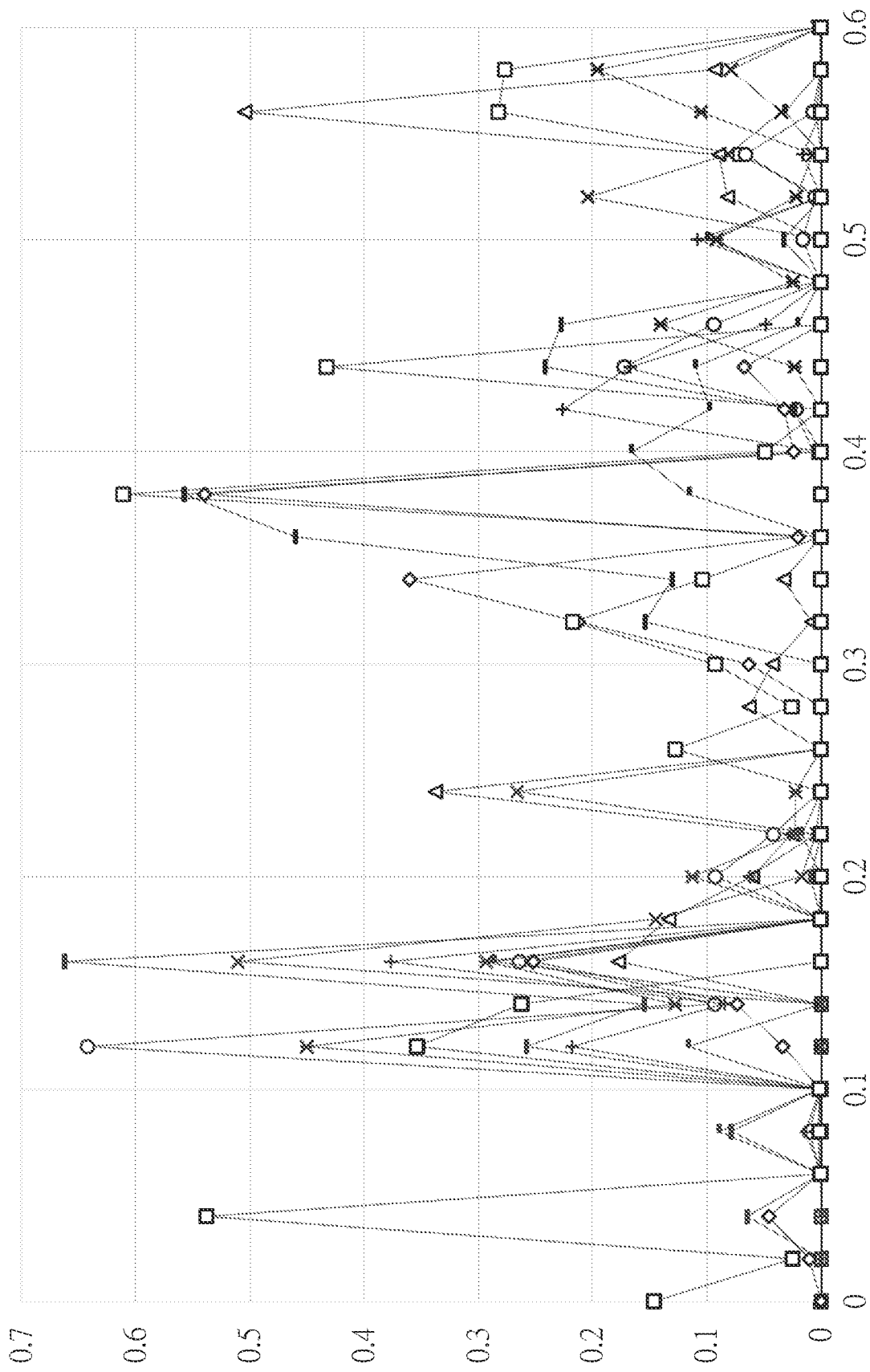
FIG. 5F shows the impact force data graph of the invention, under the condition that the through holes and the return groove are connected non-tangentially, and the radius of curvature is 0.9 mm.

For computer simulation of the impact force on the return groove 41 caused by the balls 30 when passing through the return member 40 of this invention, please refer to FIGS. 5D to 5F, which show the impact force caused by the balls 30 when passing through the return groove 41, under the condition that the through holes 24 and the return groove 41 of this invention are connected in a non-tangent manner, and the ball diameter BD is 0.6 mm. Each fold line in the coordinates represents the impact force generated by each ball 30 at different time points in the return groove 41, the horizontal axis represents time, the unit is second (S), the vertical axis represents impact force, and the unit of impact force is Newton (N). When the radius of curvature R is 0.8 mm, please refer to FIG. 5D, the average impact force of the balls 30 is 0.29N, and the maximum impact force of the balls 30 is 0.75N. When the radius of curvature R is 0.85 mm, please refer to FIG. 5E, the average impact force of the balls 30 is 0.26N, and the maximum impact force of the balls 30 is 0.89N. When the radius of curvature R is 0.9 mm, please refer to FIG. 5F, the average impact force of the balls 30 is 0.38N, and the maximum impact force of the balls 30 is 0.66N.

Please also refer to FIG. 5G, where the through holes 24 and the return groove 41 are connected non-tangentially, and the ball diameter BD is 0.6 mm However, when the radius of curvature R is 1.0 mm, the condition that the radius of curvature R is less than or equal to 1.5 times the ball diameter BD can no longer be satisfied, so the test result shows that the balls 30 will be stuck and cannot flow back smoothly.

In summary, under the condition that the radius of curvature R is 0.8 mm, the average impact force of the balls 30 is only 0.29N when the through holes 24 and the return groove 41 are connected in a non-tangential manner, and the average impact force of the ball 90 is increased to 1.5N when the return passage 81 and the through holes 71 are connected in a tangential manner. In addition, under the condition that the radius of curvature R is 0.9 mm, the average impact force of the balls 30 is only 0.38N when the through holes 24 and the return groove 41 are connected in a non-tangential manner, and the average impact force of the balls 90 is increased to 3.7N when the return passage 81 and the through holes 71 are connected in a tangential manner.

Based on the foregoing, the present invention mainly defines that the radius of curvature R is greater than or equal to 1.2 times the ball diameter BD but is less than or equal to 1.5 times the ball diameter BD, and the opening end 241 and the connecting end 411A are connected in a non-tangential manner, which can effectively reduce the problem of ball squeezing caused by the unsmooth flow of the balls 30.

What is claimed is:

1. An external circulation ball screw comprising:
   a screw shaft;
   a nut sleeved on the screw shaft, a ball passage being formed between the nut and the screw shaft, the nut including at least one through hole in communication with the ball passage, the at least one through hole including an opening end;
   a plurality of balls disposed and circulating in the ball passage, and each of the balls having a ball diameter; and
   a return member mounted on the nut, and including a return groove in communication with the at least one through hole, the return groove including a return section in communication with the at least one through hole, one end of the return section connected to the at least one through hole including a connecting end which abuts against the opening end, wherein the opening end and the connecting end are connected in a non-tangential manner, the return section circles around a reference point, the return section corresponds to an outer wall surface, the outer wall surface is arc-shaped and centered on the reference point, a distance between the outer wall surface and the reference point is defined as a radius of curvature, and the radius of curvature is greater than or equal to 1.2 times the ball diameter, but is less than or equal to 1.5 times the ball diameter.

2. The external circulation ball screw as claimed in claim 1, wherein the ball diameter is between 1.0 mm and 0.4 mm.

3. The external circulation ball screw as claimed in claim 1, wherein the return groove includes a continuation section and a outlet section, another end of the return section is connected to the continuation section, the continuation section is connected to the outlet section, the number of the at least one through hole is two, and the outlet section is in communication with another one of the two through holes.

4. The external circulation ball screw as claimed in claim 1, wherein the nut includes an insertion hole for insertion of the screw shaft, the screw shaft includes an external thread groove, the nut includes an inner surface and an outer surface opposite to each other, the inner surface faces the insertion hole and includes an internal thread groove corresponding to the external thread groove, the ball passage is formed between the internal thread groove and the external thread groove, the return member is mounted on the outer surface of the nut, and the at least one through hole penetrates the outer surface at the opening end.

5. The external circulation ball screw as claimed in claim 1, wherein the nut includes two first thread holes, the return member includes two second thread holes, the two second thread holes are located corresponding to the two first thread holes respectively, and two locking members are respectively inserted through the first thread holes and the second thread holes.

* * * * *